United States Patent [19]

Hager

[11] Patent Number: 4,664,870

[45] Date of Patent: May 12, 1987

[54] TESTABLE VOTED LOGIC POWER INTERFACE

[75] Inventor: Robert E. Hager, Penn Hills, Pa.

[73] Assignee: Westinghouse Electric Corp., Pittsburgh, Pa.

[21] Appl. No.: 793,382

[22] Filed: Oct. 31, 1985

[51] Int. Cl.⁴ .............................................. G21C 7/36
[52] U.S. Cl. ................... 376/215; 376/259; 364/492; 364/579
[58] Field of Search ............... 376/215, 259; 364/492, 364/579

[56] References Cited

U.S. PATENT DOCUMENTS

| | | |
|---|---|---|
| 3,223,590 | 12/1965 | Troeger . |
| 3,424,652 | 1/1969 | Oehmann . |
| 3,437,556 | 4/1969 | Bevilacque et al. . |
| 3,748,540 | 7/1973 | Eggenberger et al. . |
| 3,967,257 | 6/1976 | Hager . |
| 4,434,132 | 2/1984 | Cook .................................. 376/215 |
| 4,447,851 | 5/1984 | Simmons ........................... 376/215 |
| 4,562,035 | 12/1985 | Plaje ................................. 376/215 |
| 4,574,068 | 3/1986 | Hill ................................... 376/215 |

Primary Examiner—Donald P. Walsh
Attorney, Agent, or Firm—Daniel C. Abeles

[57] ABSTRACT

In a protection system for a complex process control system which generates three independent actuation signals, the power interface circuit includes three pairs of switches arranged in three parallel groups of switches connected in series with the load and a voltage source. Each group of switches includes two switches selected from different pairs of switches and connected in series. Normally closed switches are used with normally energized loads and normally open switches with normally de-energized loads. Logic gates control actuation of each individual switch in response either to an associated actuation signal or a test signal generated by a microprocessor. The microprocessor generates a sequence of patterns of test signals which result in various combinations of switch actuations. The current through each group of switches resulting from each combination of switch actuations is compared by the microprocessor with expected values to evaluate circuit performance.

7 Claims, 3 Drawing Figures

TESTABLE VOTED LOGIC POWER INTERFACE

CROSS-REFERENCE TO RELATED APPLICATIONS

Commonly owned U.S. patent application entitled "Voted Logic Power Circuit and Method of Operating Same" filed concurrently herewith in the names of Bruce M. Cook and Jerzy Gutman and identified by Ser. No. 793,383 filed 10/31/85.

My commonly owned United States patent application entitled "Testable, Fault-Tolerant Power Interface Circuit For Normally De-Energized Loads" filed concurrently herewith and identified by Ser. No. 793,381 filed 10/31/85.

Commonly owned United States patent application entitled "Self-Compensating Voted Logic Power Interface with Tester" filed concurrently herewith in the name of Henry F. Cook and identified by Ser. No. 793,422 filed 10/31/85.

FIELD OF THE INVENTION

This invention relates to protection systems for complex processes, such as nuclear power plants, in which voted logic power circuits are used to actuate protective equipment. More particularly, it is directed apparatus and method for on-line testing of such circuits.

PRIOR ART

Protection systems for complex processes monitor selected process parameters, such as temperatures, pressures and flows, and the status of various components such as whether a valve is open or closed or whether a pump is on or off, and provide automatic responses to measured values of the parameters and to detected status states of the components which require positive intervention to prevent, or to alleviate the effects of, abnormal process conditions. High reliability is an essential requirement for such a system. In order to enhance reliability, it is common practice to provide redundant sensors for each selected parameter and component status. It is also common practice to vote the responses of the redundant sensors; that is to require that a plurality, but not necessarily all, of the sensors detect the abnormal condition before action is initiated in order to reduce the probability of a spurious actuation.

A nuclear power plant is one example of a complex process in which such a protection system is employed. The protection system in a nuclear power plant performs a plurality of functions. It can shutdown, or trip, the reactor if conditions warrant, or it can perform a number of engineered safeguard functions, such as opening or closing valves and turning on or off pumps or other components. Typically, the trip function involves de-energizing electromechanical jacks which normally hold control rods in a position withdrawn from the reactor core so that the rods reenter the core and cause it to go subcritical. The engineered safeguard functions may involve either de-energizing a load device which is normally energized or energizing a device which is normally de-energized. In a typical engineered safeguard function system, four redundant sensors are used to detect the selected parameters and/or status conditions. The response of each sensor is compared with a setpoint value to generate a digital signal which is referred to as a partial actuation signal, since an indication from more than one sensor is required to actuate the safety component. The four partial actuation signals for each parameter or status condition are all fed to each of two identical, electrically isolated logic trains. Typically, this is accomplished by applying each partial actuation signal to the coil of a relay having one set of contacts in each logic train. Each logic train independently votes the partial actuation signals, such as two out of four, and generates an actuation signal. The two independently generated actuation signals are then applied to a power interface circuit which requires the presence of both actuation signals to actuate the load device, either a normally energized or normally de-energized component, to initiate the engineered safeguard function. Such a two out of two voting power interface can be disabled by a single failure in one of the two channels.

Regulations require periodic testing of the protection system including the switches in the power interface. At present, testing of the switching devices is done manually. In the case of a normally energized load which cannot be de-energized while the plant is in operation, the apparatus and method used are as described in U.S. Pat. No. 3,967,257. This involves connecting a current monitor in series with the switching device under test and connecting in parallel with that combination, a second switching device which is also equipped with a visual current monitor. To perform the test, the second switching device is first "closed" in order to maintain power to the load. The device under test is then exercised while the corresponding current monitor is observed as an indication of its switching state.

In order to provide tolerance to single failures in a logic train or switching device, the cross-referenced application identified by Ser. No. 793,383 filed 10/31/85 proposes the use of a two out of three voting power interface instead of the common two out of two arrangement. The interface described there utilizes serially connected groups of parallel connected switches with large resistors shunting the switches to provide a leakage path for measuring current through the interface to determine switch condition.

It is a primary object of the invention to provide novel apparatus and a method for automatically testing voted logic power interface circuits.

It is another object of the invention to make such tests while maintaining the protection function of the protection system.

SUMMARY OF THE INVENTION

These and other objects of the invention are realized in an n out of m voted power interface. When incorporated into a protection system, such as for example would be used with a nuclear reactor, practical values for n and m are two and three respectively, so that confirmation by two out of three independent sources is required to initiate action. Such a two out of three interface includes three pairs of switches arranged in three parallel connected groups of switches. Each group includes a different combination of two switches connected in series, each from a different one of the three pairs of switches. The three parallel connected groups of switches are connected in series with a load and an electric power source. Each pair of switches is actuated by a separate actuation signal such that two out of three of the pairs of switches must be actuated to actuate the load. The switches are normally closed and are actuated to the open position in the case of a normally energized load while normally open switches are used with a normally de-energized load.

The power interface circuit is tested by a test generator which generates a test signal for each switch in the power interface. A gate associated with each switch actuates the switch in response to either the actuation signal associated with that switch or the test signal. Current detectors detect the current flowing through the switches in each group of serially connected switches. The test generator generates patterns of test signals which actuate selected switches and compares the currents detected by the current detectors with expected values for each pattern. Deviations from the expected pattern indicate malfunctions in the system. For normally energized loads, the protection function remains operational while the power interface is being tested.

BRIEF DESCRIPTION OF THE DRAWINGS

A full understanding of the invention can be gained from the following specification when read in conjunction with the accompanying drawings in which.

DESCRIPTION OF THE PREFERRED EMBODIMENTS

Figure 1:
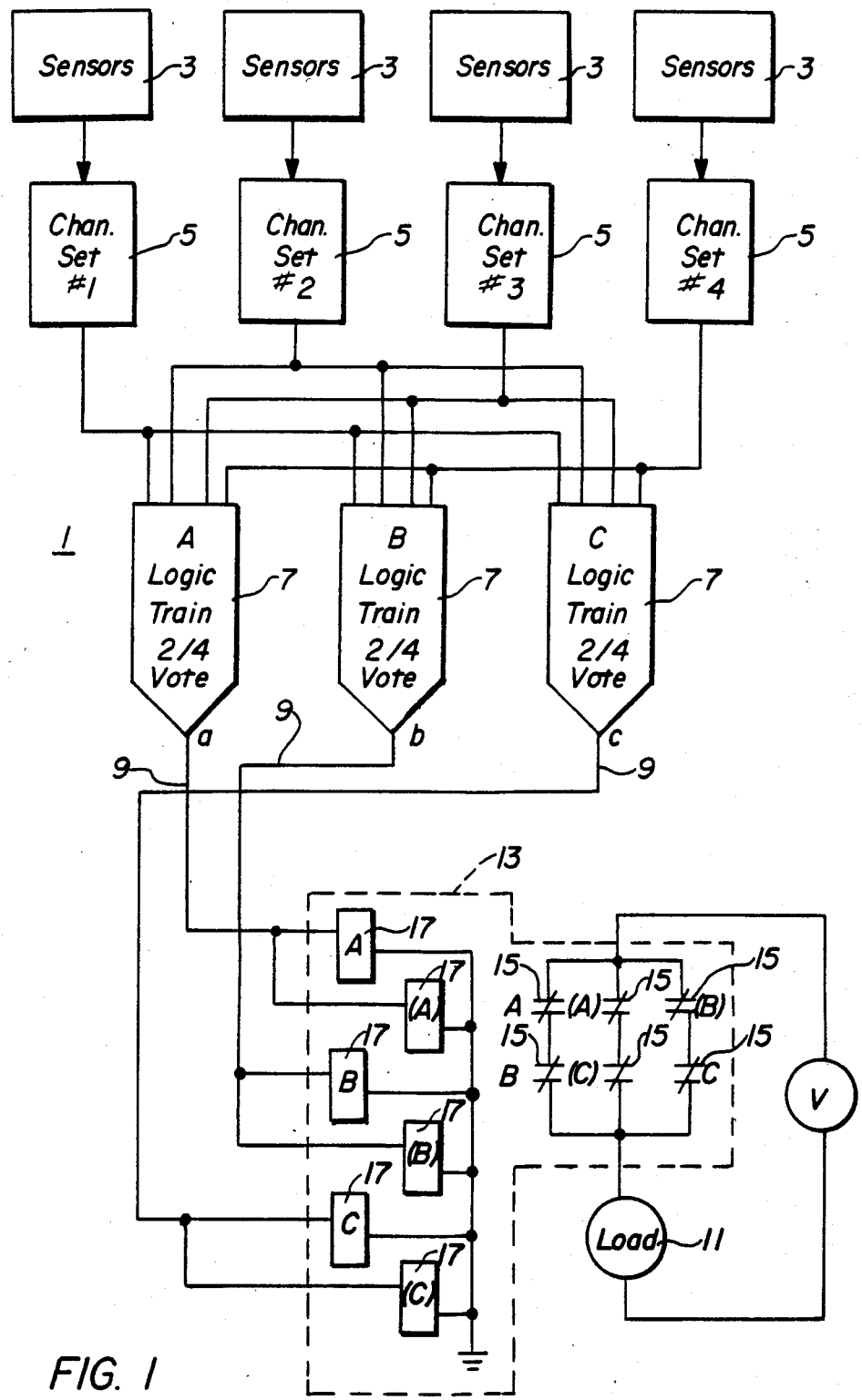
FIG. 1 is a schematic diagram of a protection system including a power interface circuit for a normally energized load constructed in accordance with the teachings of the present invention.

The invention will be described as applied to the protection system for a nuclear power plant although it could also be incorporated into the protection system for many other types of complex processes. As shown in FIG. 1, the exemplary system 1 employs four redundant sets of sensors 3 to monitor selected plant parameters such as pressure, temperature, flow, radiation level, et cetera, and/or the status of various components, such as whether a valve is open or closed or whether a pump is running or not. Where such a system is used for a particular safeguard function, the sensors 3 may monitor only one or a plurality of plant parameters or conditions. The signals generated by each set of sensors 3 are applied to separate channel sets 5, numbered 1 through 4 in FIG. 1, where the detected values of the sensor signals are analyzed for an indication of an abnormal condition by comparing them with selected setpoint values. In some instances, the values of measured parameters are used to calculate other parameters which are then compared with limiting values for an indication of an abnormal condition as is well-known in the field of control system engineering. Each channel set generates a digital output signal which indicates whether or not the sensors in that channel set are sensing conditions which warrant actuation of the associated safeguard function. Since confirmation by more than one channel set is required to initiate the safeguard function, the digital signals are referred to as "partial actuation signals".

The partial actuation signals from each of the channel sets 5 are each applied to three independent logic trains 7 labeled A, B and C in FIG. 1. In order to provide separation between the redundant partial actuation signals, they are electrically isolated from one another such as by applying each of them to the coil of a separate relay in each logic train as is now common practice. The coil to contact separation of these relays provides the electrical isolation between the actuation signals and between the logic trains. Isolation could also be provided for instance, by optical isolators where solid state switches are used in place of relays.

The logic trains 7 independently vote the partial trip signals received from the four channel sets 5 and generate an actuation signal a, b or c on their associated output lines 9 when the prescribed number of partial trip signals is detected. Typically, two out of four voting logic is employed by these logic trains. That is, two out of the four channel sets must be generating a partial actuation signal in order for the logic train to generate an actuation signal. Such a scheme allows for failures which preclude the generation of a partial actuation signal by two of the channel sets, while reducing the likelihood of a spurious trip which could occur if only one partial trip signal was required to generate an actuation signal. In the normal course of events, all four channel sets would generate partial actuation signals upon the occurrence of the abnormal condition, and all three logic trains 7 would generate an actuation signal. Of course, voting strategies other than two out of four could be employed by the logic trains 7.

The actuation signals on the leads 9 are utilized to control the energization of a load device 11 by a voltage source V through a power interface identified generally in FIG. 1 by the reference character 13. The load device 11 may be any type of electrically operated device which effects an automatic response to the detection of the associated abnormal condition. Such a device could be for example, a pump, an electrically controlled valve, a heater, a circuit breaker or any motor driven device. In the system of FIG. 1, the load device would be a normally energized device, but as will be seen, the invention can also be used with normally de-energized load devices also.

The power interface 13 includes a network of switches connected in series with the load device 11 across the voltage source V. In the circuit of FIG. 1, the switches are the normally closed contacts 15 of relays A, (A), B, (B), C and (C). The coils 17 of two relays are connected to the output line 9 from each logic train 7. The contacts of these coils are connected in three groups 19 of two contacts each with the two contacts in each group connected in series and the groups connected in parallel. The two contacts in each group are associated with relays energized by different logic trains. Thus, the first group includes the break contacts of relays A and B; the second, contacts of relays (A) and (C); and the third contacts of relays (B) and C. Hence, it will be seen from FIG. 1, that for any combination of actuation signals generated on the lines 9 by two out of three of the logic trains 7, contacts will be opened in the power interface 13 to actuate the load device 11 by interrupting the circuit between the voltage source V and the device. With this power interface, protection against spurious actuations is provided by requiring confirmation of the abnormal condition by at least two of the logic trains, yet a failure in any one logic channel will not disable the system.

Figure 2:
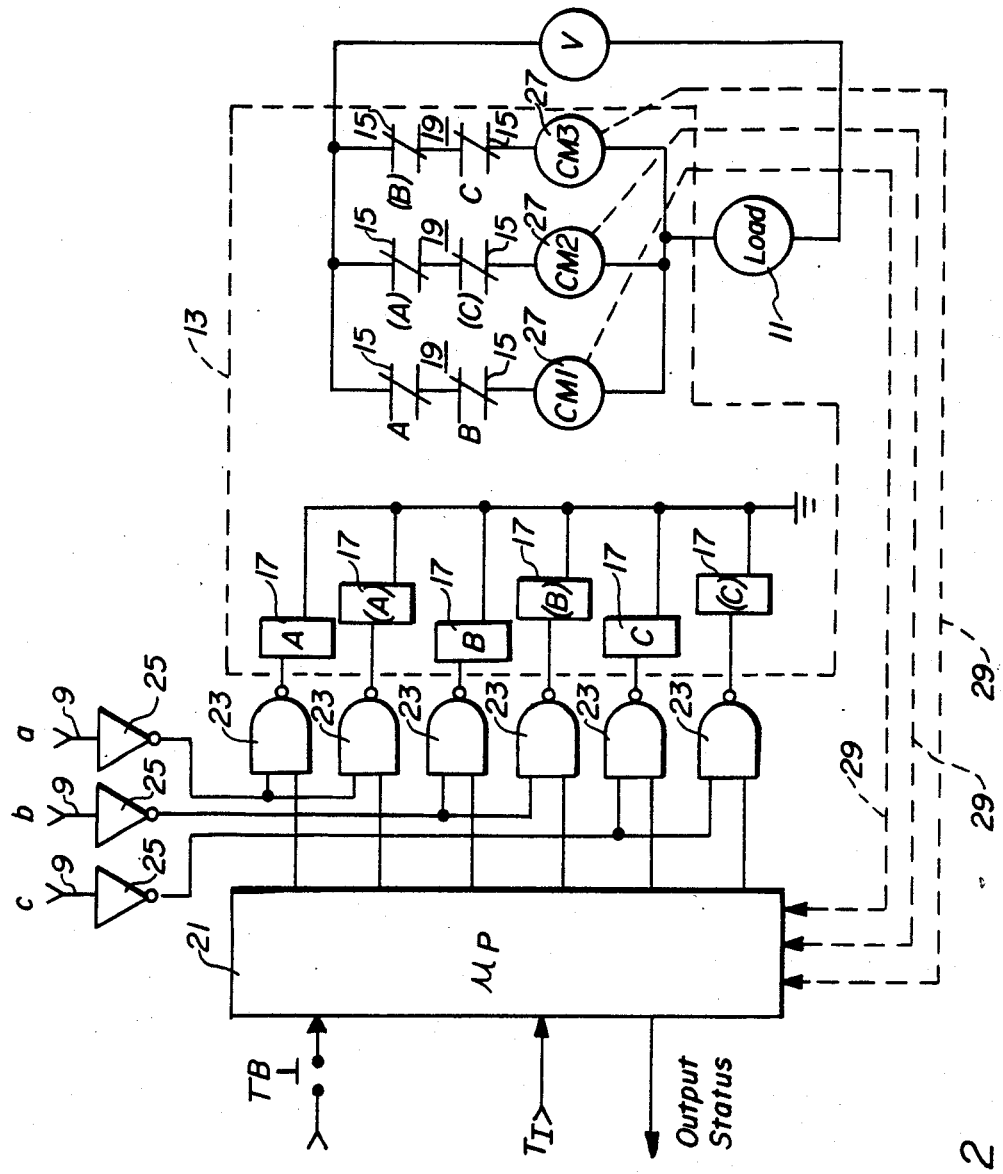
FIG. 2 is a schematic diagram of the power interface circuit of FIG. 1 with a tester.

The invention encompasses a unique arrangement for testing power interfaces such as that shown in FIG. 1. FIG. 2 illustrates an arrangement for testing the power interface circuit 13 for a normally energized load 11 that forms part of the protection system 1 shown in FIG. 1. The arrangement includes a test unit or generator 21 in the form, for example, of a microprocessor. The microprocessor 21 generates a separate test signal for each of the relays of power interface circuit 13. Each test signal is applied to the coil 17 of the associated relay through a NAND circuit 23. A logic level actuation signal a, b or c generated on a line 9 by one of the three logic trains 7 (see FIG. 1) is applied as a second input to each NAND circuit 23 through an inverter 25. When not in the test mode, the microprocessor 21 generates a high level signal which gates any actuation signal generated by a logic train to the appropriate relay coil. During testing, which may be initiated automatically through application of a test initiate signal TI to the microprocessor 21, or manually through actuation of the test button TB, the microprocessor sequentially generates patterns of low level signals which result in energization of the associated relay coils 17 through the intervening NAND circuit 23.

The test apparatus also includes current detectors 27 connected in series with each group 19 of contacts 15 in the power interface circuit. Energization of the coil of the relay associated with either set of contacts in each group of contacts 19 results in interruption of the current through that group which is detected by the associated current detector 27. The currents detected by the current detectors 27 are reported to the microprocessor 21 over lines 29.

Figure 3:
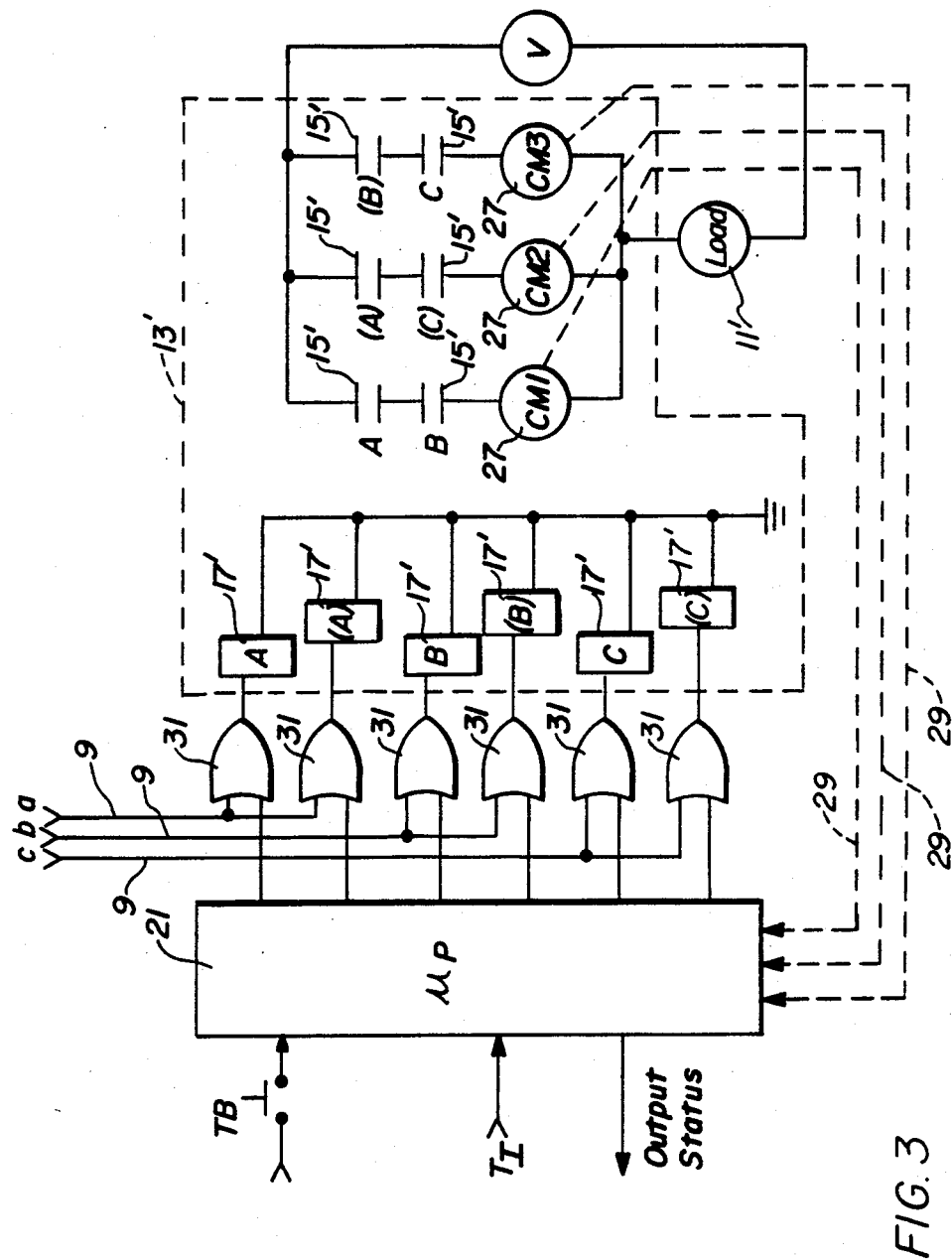
FIG. 3 is a schematic diagram of a power interface circuit with a tester according to the invention for a normally de-energized load.

FIG. 3 illustrates the invention as applied to a power interface circuit 13' for a normally de-energized load 11'. In this arrangement, the logic level actuation signals a, b and c are applied to the appropriate relay coils 17', without inversion, through OR circuits 31. The microprocessor 21, when not in the test mode, applies low level logic signals to the OR circuits 31 so that the actuation signals, when generated, are gated to the associated relay coil. During testing, the microprocessor sequentially generates patterns of high level logic signals which energize the coil 17' of the associated relay to close the appropriate normally open contacts 15' in power interface circuit 13'. Again, current detectors 27' monitor the current flowing through the three groups 19' of relay contacts and feed the readings back to the microprocessor 21 through leads 29'. In order to detect the proper operation of the circuit, the relays associated with both sets of normally open contacts 15 must be energized so that a current flows through the associated current detector 27. This also results in energizing the load 11'. This momentary energization of the normally de-energized load during testing is tolerable for some engineered safeguard functions. For those situations where even momentary energization cannot be tolerated, my copending application identified by Ser. No. 793,381 filed 10/31/85 referred to above, reduces the energizing voltage below that required to actuate the load 11' while providing sufficient current to be detected by the current detectors 27.

The choice of gate circuits such as the NAND circuits in FIG. 2 and the OR circuits of FIG. 3 is dependent upon whether the load is normally energized or de-energized and upon the desired failure state. For instance, by using NAND gates in FIG. 2 with a normally energized load, failure of the microprocessor so that high level gating signals are not applied to the gates, results in actuation, in this case de-energization, of the load. On the other hand, by using OR gates in FIG. 3 with a normally de-energized load, failure of the tester which applies low level signals to the OR gates during normal operation anyway, does not result in actuation of the load. In either case, generation of 2 out of 3 actuation signals a, b and c always results in actuation of the load.

Table I below illustrates a sequence of step signals generated by the microprocessor 21 for testing the circuit of FIG. 2 and the expected results from each test sequence.

TABLE I

Test Sequence for Normally Energized Load

| Step | Test Input | | | | | | Output | | |
| | A | (A) | B | (B) | C | (C) | cm 1 | cm 2 | cm 3 |
| --- | --- | --- | --- | --- | --- | --- | --- | --- | --- |
| 1 | 1 | 1 | 1 | 1 | 1 | 1 | 1 | 1 | 1 |
| 2 | 0 | 1 | 1 | 1 | 1 | 1 | 0 | 1 | 1 |
| 3 | 1 | 1 | 0 | 1 | 1 | 1 | 0 | 1 | 1 |
| 4 | 1 | 0 | 1 | 1 | 1 | 1 | 1 | 0 | 1 |
| 5 | 1 | 1 | 1 | 1 | 1 | 0 | 1 | 0 | 1 |
| 6 | 1 | 1 | 1 | 0 | 1 | 1 | 1 | 1 | 0 |
| 7 | 1 | 1 | 1 | 1 | 0 | 1 | 1 | 1 | 0 |
| 8 | 0 | 0 | 1 | 1 | 0 | 1 | 0 | 0 | 0 |
| 9 | 0 | 0 | 1 | 0 | 1 | 1 | 0 | 0 | 0 |
| 10 | 1 | 0 | 0 | 0 | 1 | 1 | 0 | 0 | 0 |
| 11 | 1 | 1 | 0 | 0 | 1 | 0 | 0 | 0 | 0 |
| 12 | 0 | 1 | 1 | 1 | 0 | 0 | 0 | 0 | 0 |
| 13 | 1 | 1 | 0 | 1 | 0 | 0 | 0 | 0 | 0 |

Step 1 is the normal operating mode wherein the microprocessor applies high level signals to all of the NAND circuits 23 in FIG. 2 so that any actuation signals a, b, or c generated by the logic trains 7 are gated to the appropriate relay coils 17. Steps 8 through 13 of Table I are omitted if the load may not be de-energized during testing.

Table II illustrates a test sequence and the expected results for the circuit of FIG. 3.

TABLE II

Test Sequence for Normally De-Energized Load*

| Step | Test Input | | | | | | Output | | |
| | A | (A) | B | (B) | C | (C) | cm 1 | cm 2 | cm 3 |
| --- | --- | --- | --- | --- | --- | --- | --- | --- | --- |
| 1 | 0 | 0 | 0 | 0 | 0 | 0 | 0 | 0 | 0 |
| 2 | 1 | 0 | 0 | 0 | 0 | 0 | 0 | 0 | 0 |
| 3 | 0 | 1 | 0 | 0 | 0 | 0 | 0 | 0 | 0 |
| 4 | 0 | 0 | 1 | 0 | 0 | 0 | 0 | 0 | 0 |
| 5 | 0 | 0 | 0 | 1 | 0 | 0 | 0 | 0 | 0 |
| 6 | 0 | 0 | 0 | 0 | 1 | 0 | 0 | 0 | 0 |
| 7 | 0 | 0 | 0 | 0 | 0 | 1 | 0 | 0 | 0 |
| 8 | 1 | 0 | 1 | 0 | 0 | 0 | 1 | 0 | 0 |
| 9 | 0 | 1 | 0 | 0 | 0 | 1 | 0 | 1 | 0 |
| 10 | 0 | 0 | 0 | 1 | 1 | 0 | 0 | 0 | 1 |

*For loads which may be energized during test

Again step 1 represents the normal state between tests when low level signals are applied to all of the OR circuits 31 of FIG. 2 so that any actuation signals a, b or c from the logic trains 7 may be gated to the appropriate relay coil. While steps 2 through 7 in which only one coil at a time is energized normally do not result in any current through the detectors 27, they are useful in detecting certain malfunctions. For instance, if the other set of contacts in the group is stuck closed or the coil associated with that other set of contacts is energized due to some malfunction, a circuit is completed and would be detected by the associated current detector 27.

The microprocessor 21 compares the current detected by the current detectors 27 with expected values for each combination of test signals generated. The results of these comparisons are used by the microprocessor to generate an output status signal indicating whether or not any malfunctions were detected during the test. Since the microprocessor performs the tests rapidly and does not disable the protection function, tests can be run frequently to closely monitor circuit conditions.

While the invention has been described using relays as the switches, other types of switching devices could also be used, such as for example, triacs, SCRs, or power MOSFETs. As mentioned above, the relays inherently provide electrical isolation by means of the coil-contact separation. The solid state switches may be electrically insolated to maintain separation of the channels by, for instance, opto-isolators or other suitable protection grade isolation devices.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A testable power interface circuit for use in a protection system of a complex, process control system comprising:
   a load
   an electric power source;
   three pairs of switches arranged in three groups with said groups of switches connected in parallel with each other and in series with the load and the electric power source, each said group of switches including a different combination of two switches connected in series, each from a different one of said pairs of switches;
   separate means for applying an actuating signal to each pair of switches, such that said load is actuated when at least any two out of said three pairs of switches are actuated;
   a test unit for selectively generating a test signal for each switch;
   means for applying said test signal to each switch without removing said actuation signal such that said load is responsive to the actuation signals even while test signals are applied to said switches; and
   current measuring means for measuring the current flowing through each said group of switches and for applying said measurements to the test unit, said test unit including means for generating selected patterns of test signals to actuate selected patterns of said switches, for storing expected currents through said groups of switches in response to said patterns, for comparing the measured currents with said stored currents, and generating outputs representative of said comparisons.

2. The combination of claim 1 wherein said switches are normaly closed and are opened when actuated and said load is a normally energized device which is actuated when de-energized.

3. The combination of claim 1 wherein said switches are normally open and are closed when actuated and said load is a normally de-energized device which is actuated when energized.

4. Apparatus for testing a power interface circuit connecting a load device to an electric power source through m sets of switches arranged in a network such that n out of said m sets of switches must be actuated by separate actuating signals to actuate said load device, said apparatus comprising:
   a test generator for selectively generating a test signal for each of said switches;
   a gate device connected to each of said switches for controlling the actuation thereof in response to at least one of said actuating signal associated with that switch and the test signal for that switch; and
   current measuring means for measuring the current in selected portions of said network of switches and for applying said measurements to the test generator, said test generator including means for generating selected patterns of test signals to actuate selected switches, for storing expected current measurements for each selected pattern, for comparing the current measurements detected by said current measuring means with the stored expected measurements and generating output signals representative of the comparisons.

5. The apparatus of claim 4 wherein the switches in said network are arranged in a plurality of groups of switches with said groups of switches connected in parallel with each other and in series with the load and the electric power source, and each group of switches includes, a different combination of n switches connected in series each from a different one of said pair of switches, said plurality of groups of switches including all possible different combinations of m switches taken n at a time, and wherein said current detecting means includes a current detector to detect the current flowing through each group of switches.

6. A testable power interface circuit for connecting a load device in a nuclear power plant protection system to an electric power source in response to the generation of two out of three actuation signals by the protection system, comprising:
   three pairs of switches arranged in three groups with said groups of switches connected in parallel with each other and in series with the load device and the electric power source, each said group of switches including a different combination of two switches connected in series, each from a different one of said pairs of switches;
   a test unit for selectively generating a test signal for each switch;
   a gate device connected to each switch for controlling the actuation thereof in response to at least one of an actuation signal associated with the switch and the test signal generated by the test unit for that switch, each of said actuation signals generated by the protection system being applied to the gate device associated with the switches of one of said groups of switches such that the generation of at least any two oout of three of said actuation signals actuates the load device; and
   current measuring means for measuring the current flowing through each said group of switches and for applying said measurements to the test unit, said test unit including means for generating selected patterns of test signals to actuate selected patterns of said switches, for storing expected currents through said groups of switches in response to said patterns, for comparing the measured currents with said stored currents, and generating outputs representative of said comparisons.

7. A method of testing a power circuit connecting a load device to an electric power source through a plurality of m sets of switches arranged in a plurality of parallel connected groups of switches each comprising a different selection of n switches connected in series each from a different one of said m sets of switches such that by actuation of n out of said m sets of switches, each by a separate actuation signal, the load is actuated, said method comprising the steps of:

generating separate test signals for each switch and sequentially generating patterns of said test signals;

applying the test signal associated with each switch and the actuation signal associated with that switch to the switch through a gating device such that the switch is actuated in response to either one of said test signal and actuation signal;

measuring the current flowing through each group of series connected switches;

storing expected measurements of the current flowing through each group of series connected switches for each said pattern of test signals;

comparing the measured current flowing through each group of switches for each pattern of test signals with the expected measurements; and generating an output signal as a function of said comparisons.

* * * * *